United States Patent [19]
Chamussy et al.

[11] Patent Number: 5,583,482
[45] Date of Patent: Dec. 10, 1996

[54] DEVICE FOR MONITORING TIRES WITH TRANSMISSION OF ELECTRIC SIGNALS THROUGH THE WHEEL DISKS

[75] Inventors: Jean-Francois Chamussy, Blois; Jean-Louis Gesta, Chateaugay; Bernard Taillandier, Cebazat, all of France

[73] Assignee: Compagnie Generale des Etablissements Michelin-Michelin & Cie, Clermont-Ferrand Cedex, France

[21] Appl. No.: 264,977

[22] Filed: Jun. 24, 1994

[30] Foreign Application Priority Data

Jun. 25, 1993 [FR] France ................................. 93 07880

[51] Int. Cl.⁶ ............................................. B60C 23/00
[52] U.S. Cl. ...................... 340/442; 340/447; 73/146.5; 200/61.22; 116/34 R
[58] Field of Search ................................ 340/442, 447, 340/448; 73/146.5; 200/61.22, 61.26; 116/34 R

[56] References Cited

U.S. PATENT DOCUMENTS

| | | | |
|---|---|---|---|
| 2,190,117 | 2/1940 | Griffith | 340/442 |
| 2,362,883 | 11/1944 | Cecil | 340/442 |
| 2,720,638 | 10/1955 | Ritch | 340/442 |
| 2,790,155 | 4/1957 | Lucia et al. | 340/442 |
| 3,185,960 | 5/1965 | Howard | 340/442 |
| 3,241,112 | 3/1966 | Linkmeyer | 340/442 |
| 3,508,193 | 4/1970 | Giovannelli et al. | 340/442 |
| 3,978,448 | 8/1976 | Vago | |
| 3,987,407 | 10/1976 | Bruner | 340/442 |
| 4,283,707 | 8/1981 | Church | 340/442 |
| 4,532,493 | 7/1985 | Sibeud | |
| 5,033,295 | 7/1991 | Schmid et al. | |
| 5,052,484 | 10/1991 | Gesta | 439/188 |
| 5,179,981 | 1/1993 | Hicks et al. | 340/442 |
| 5,231,391 | 7/1993 | Rigaux | |
| 5,263,524 | 11/1993 | Boardman | 340/442 |
| 5,285,189 | 2/1994 | Nowicki et al. | 340/442 |

FOREIGN PATENT DOCUMENTS 0503296  9/1992  European Pat. Off. .

Primary Examiner—Jeffery Hofsass
Assistant Examiner—Nina Tong
Attorney, Agent, or Firm—Oblon, Spivak, McClelland, Maier & Neustadt, P.C.

[57] ABSTRACT

A device for monitoring tires, including a central processing unit and for each wheel a measuring sensor connected by an electrical connection to a mobile antenna integral with a hub of the wheel as well as a stationary antenna integral with the hub carrier of the wheel and coupled to the stationary antenna. The central processing unit supplies the sensor with power and analyzes the measurement signals of the sensor. The electrical connection includes at least one electric conductor passing through a bolt for fastening the wheel on the hub.

11 Claims, 3 Drawing Sheets

DEVICE FOR MONITORING TIRES WITH TRANSMISSION OF ELECTRIC SIGNALS THROUGH THE WHEEL DISKS

BACKGROUND OF THE INVENTION

1. Field of the Invention

The present invention is directed to a device for monitoring tires, fastened to a vehicle wheel.

2. Discussion of the Background

Systems for the transmission of tire monitoring signals and devices for fastening them to a wheel are already known, but such conventional systems suffer from drawbacks.

U.S. Pat. No. 5,033,295 (Bosch) describes a system for detecting closing of a dual pressure contact from a modification of a reluctance of a secondary circuit, this modification of reluctance being perceptible by a tuned primary circuit. In this device, there is no transmission of energy in the secondary circuit. On the other hand, the exhibited device assumes a modification of the wheels by the addition of coils in the thickness of the wheel disks.

The "Tire Check" device of the company Technologie Sicurezza Stradale features a pressure sensor fastened to the wheel disk by two lugs tightened under two consecutive nuts, and connected to the inflation valve, and a radio transmitter connected to a receiver in the cab. Like the preceding device, this device does not transmit any activation energy to the sensor from the vehicle and relies on on-board batteries to assure the operation of the electrical elements. Furthermore, the method of mounting the lugs under the nuts of wheels exhibits the drawback of inducing considerable vibrations during tightening of the nuts with impact wrenches (factory tightening). These vibrations can damage possible electronics integral with these lugs.

The system developed by the Michelin company under the name "M.T.M.", for passenger vehicles, includes a mobile antenna mounted in the wheel disk, and a stationary antenna mounted on the caliper of the disk brake; this type of mounting could be done with wheels equipped with drum brakes only after having made considerable modifications to the production line elements that the wheels and drums are.

In the following text, by "hub" is meant the rotating hub of the wheel itself, as well as any other rotating element that is attached to it, such as a counting ring of an antilocking wheel (A.L.W.) system, rotating joint parts, etc.; and by "hub carrier" is meant the hub carrier of the wheel itself, as well as any other stationary element that is attached to it, such as an oil catcher, A.L.W. sensor support, etc. Also, by "wheel" is meant the unit including the two wheels fastened to one another during a mounting of dual tires as well as an ordinary wheel during a single tire mounting. Finally, by "wheel environment" is meant the unit including of the wheel, the hub, the hub carrier and the brake drum.

SUMMARY OF THE INVENTION

Accordingly, one object of the present invention is to provide a novel tire monitoring device which overcomes the drawbacks in the conventional systems.

More particularly, the present invention relates to the transmission of signals used in the monitoring of tires, and particularly of their pressure; and it relates more specifically to a device which uses two antennas: a first antenna mechanically connected to the wheel in the rotation of it, known as a "mobile antenna", and a second antenna mechanically connected to the wheel housing that is not mobile in rotation, known as a "stationary antenna", these two antennas being coupled so as to transmit in one direction the electric energy for activation of the sensor, and in the other direction the measurement signals coming from the sensors.

The present invention further has an objective of assuring a reliable transmission of the activation power and the measurement signals between a pressure sensor located near an inflation valve of the tire and a mobile antenna mounted on the hub of the wheel, while making it possible to fasten the sensor in a simple and secure manner, without modifying the original wheel, and—of course—at a reduced cost. The system is also compatible with a mounting of single or dual tires.

The device for monitoring tires, according to the present invention, includes a central processing unit and for each wheel a measuring sensor connected by an electrical connection to a mobile antenna fastened to the hub of the wheel as well as a stationary antenna fastened to the hub carrier of the wheel and coupled to the stationary antenna. The central processing unit supplies the measuring sensors with power and analyzes the measurement signals of the measuring sensors. Further, the electrical connection includes electric conductors passing through a bolt for fastening the wheel on the hub.

Another characteristic of the device for monitoring tires according to the present invention is that the measuring sensor is fastened to the end of the modified fastening bolt, on the exterior side of the vehicle. Furthermore, the positioning of the measuring sensor at the end of the bolt connects the sensor to the electric conductors passing through the bolt by means of an electric connector.

And according to a preferred embodiment of the present invention, the electric connector placed on the end of the bolt is of the inductive type.

Of course, the present invention applies to wheels equipped with dual tires since it suffices to use one measuring sensor with two paths instead of one and to connect in an ordinary way this sensor to the valves of the two tires.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
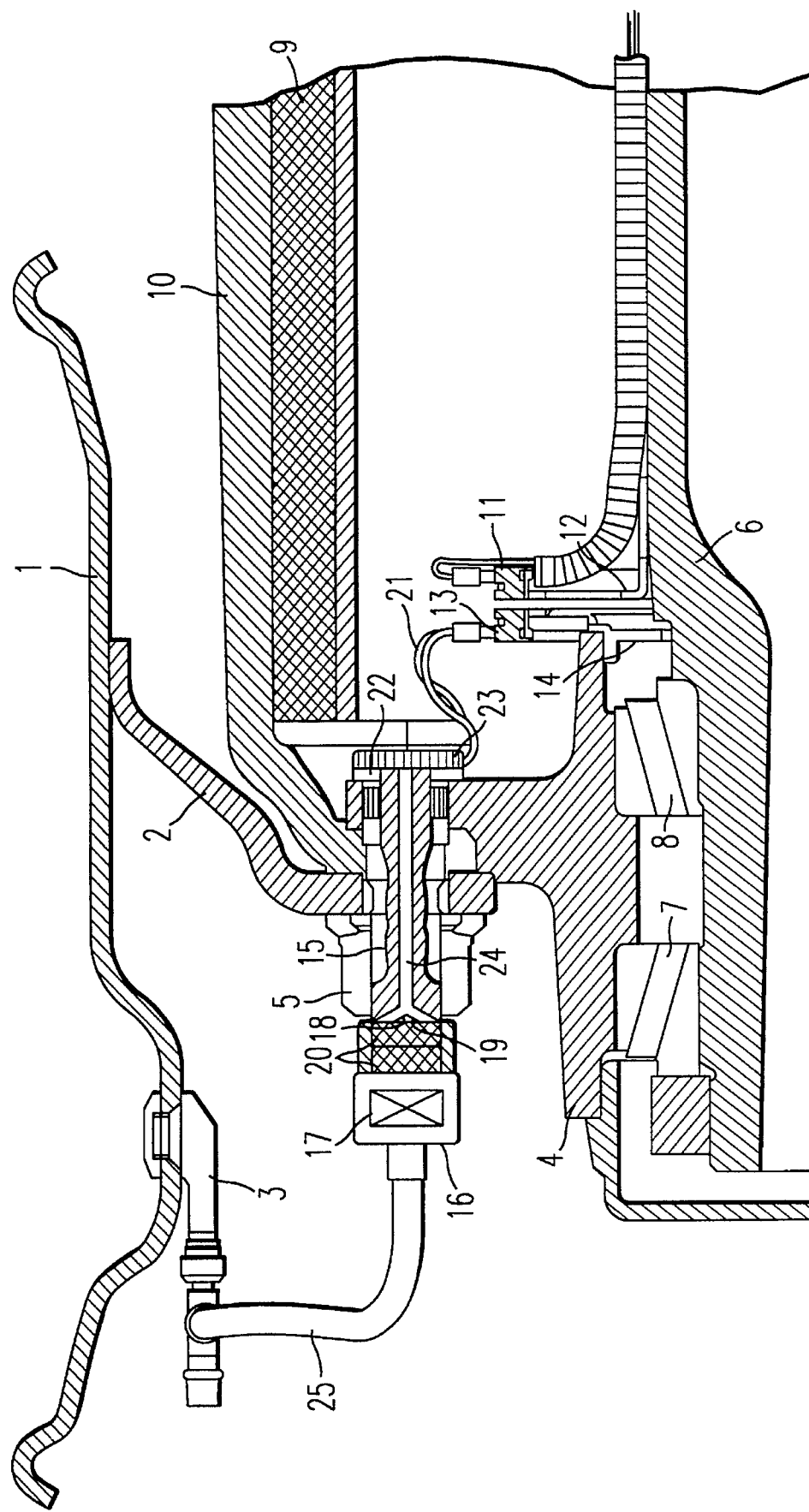
FIG. 1 is a view in half-section of a wheel, its hub, the brake drum, and the hub carrier, a section passing through the axis of the wheel and the axis of a mounting bolt according to the present invention.

Referring now to the drawings, wherein like reference numerals designate identical or corresponding parts throughout the several views, and more particularly to FIG.

1 thereof, rim 1 and disk 2 of a tubeless wheel with its inflation valve 3 are shown; this wheel is assembled on hub 4 by a certain number of bolts (not shown) and nuts, such as 5, regularly distributed on the periphery of disk 2.

In a known way, hub 4 is mounted on hub carrier 6 by roller bearings, such as 7 and 8; and the linings of brake drum 9 are mounted inside housing 10.

Two antennas for transmission of the electric signals are included and are mounted in the following manner: stationary antenna 11 is integral with a circular lug 12 fitted on hub carrier 6, while mobile antenna 13 is integral with a collar 14 fastened to the inside end of hub 4.

According to the present invention, one of the bolts 15 for attaching the wheel is modified as will be explained below. The body of this bolt 15 is provided at its outside end with means for fastening case 16 of pressure sensor 17, these means being able to very simply be the end of thread 18 of bolt 15. This same outer end of bolt 15 is pierced with a housing 19 intended to receive a connector 20 assuring the connection between sensor 17 and electric conductors 21. At its inside end, bolt 15 is provided with a plane head 22 perpendicular to the axis of the bolt and comprising a radial groove 23 for the passage of conductors 21. Finally the body of the bolt is pierced with an axial hole 24, also for the passage of conductors 21.

It is important to stress here that the principal outside dimensions of bolt 15 should optimally remain identical with those of a standard bolt. For certain methods of fastening case 16, a slight lengthening of bolt 15 toward the outside as well as a modification of the lengthened end might be necessary, but this would cause no drawback to the extent that the additional bulk remains compatible with the dimensions of the socket wrenches for tightening the wheels.

It must also be observed that the positioning of the measuring elements (sensor 17 and its case 16, connector 20, etc.) is done after the tightening of nut 5 and consequently under optimal conditions of safety and reliability for the electronics of the sensor 17.

The electric connection between sensor 17 and conductors 21 which has just been described can be of the inductive type, but it could optionally also be of another type, and particularly of the galvanic type.

A pneumatic connection 25, of a known type, is mounted on valve 3 to connect valve 3 to pressure sensor 17, while allowing the inflation of the wheel.

Figure 2:
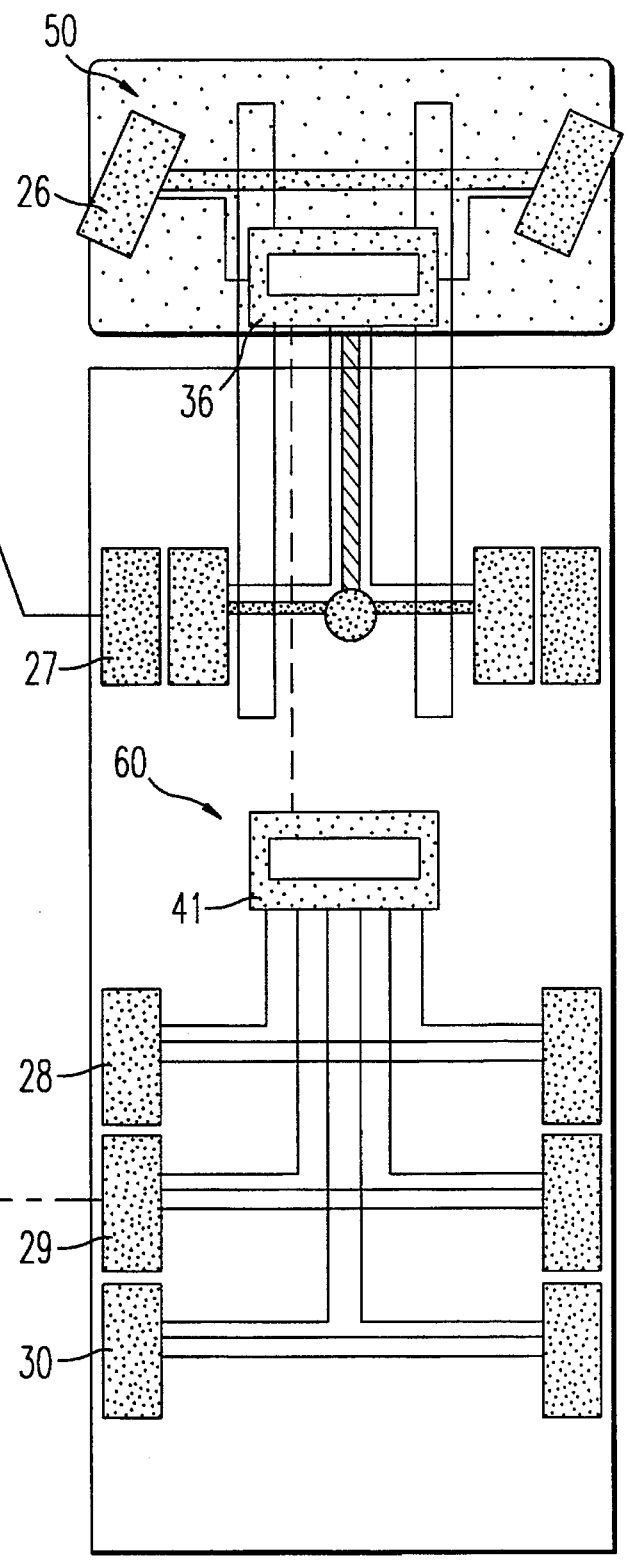
FIG. 2 is an assembly diagram for an entire heavy truck vehicle comprising a tractor and a trailer.

The diagram of FIG. 2 illustrates an example of an application of the present invention to a heavy truck vehicle including a tractor 50 and a trailer 60. Starting from the front of the vehicle, steering axle 26 and rear axle 27 of the tractor are shown, the rear axle 27 being equipped with dual tires, then the three carrier axles 28, 29 and 30 of the trailer which are equipped with large-width single tires.

Figure 3:
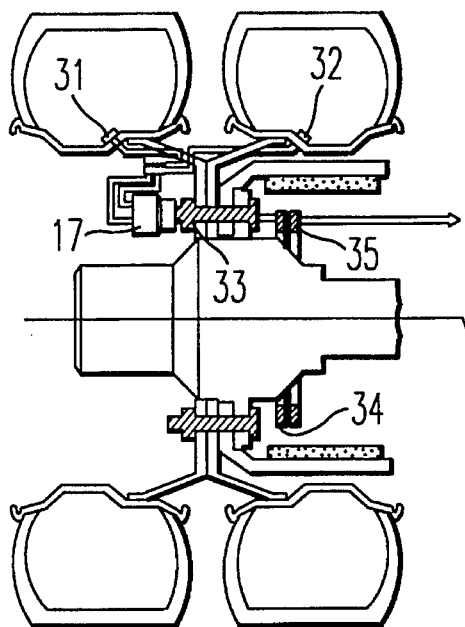
FIGS. 3 and 4 are more detailed diagrams of implementing the present invention into practice on the entire vehicle of FIG. 2.
Figure 4:
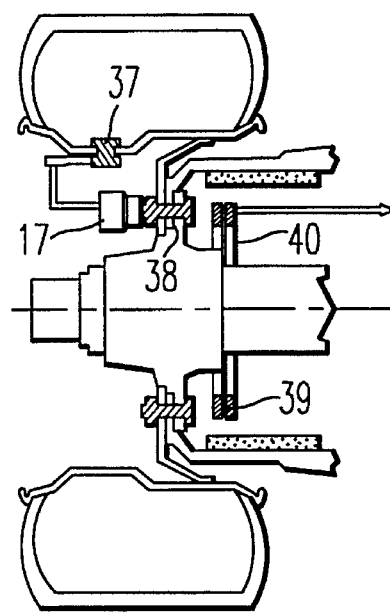

In FIGS. 3 and 4, the putting into practice of the present invention which will be described below is seen in greater detail.

In FIG. 3, valves 31 and 32 of the two dual tires mounted on the left on rear axle 27 of the tractor are connected to a sensor 17 with two measuring paths mounted on the bolt 33 according to the present invention. The signals transmitted by the connector and the two antennas 34 and 35 are then processed by a central processing unit 36 installed on the tractor; it is the same for the two dual tires mounted on the right on this rear axle.

Finally, in FIG. 4, valve 37 of each of the six tires mounted on the three axles 28, 29, 30 of the trailer is connected to a sensor 17 mounted on a bolt 38 according to the present invention. The signals transmitted by the connector and the two antennas 39 and 40 are then processed by central processing unit 41 of the trailer.

Figure 5:
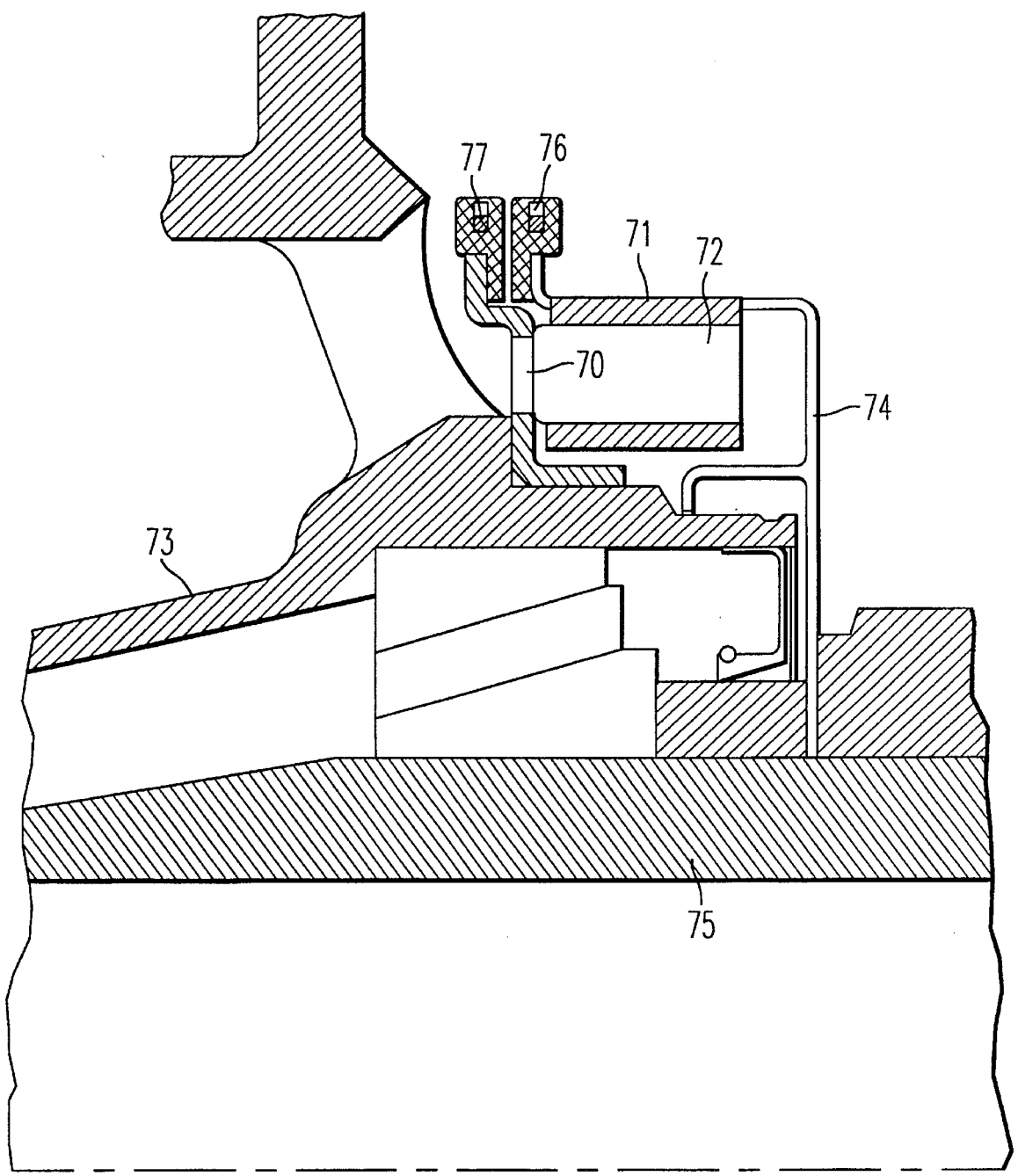
FIG. 5 is a detail of FIG. 1 relating to the installation of the stationary and mobile antennas in the case of an axle equipped with an antilocking wheel sensor.

FIG. 5 exhibits an advantageous way of positioning the stationary and mobile antennas in the case where the axle under consideration is equipped with an antilocking wheel sensor. The antilocking wheel system comprises a counting ring 70 and a support 71 for antilocking wheel sensor 72. Counting ring 70 is made integral with rotating hub 73. In the mounting represented, support 71 of sensor 72 is itself integral with an oil catcher 74 attached to stationary hub carrier 75.

Stationary antenna 76 is directly mounted on support 71 that is slightly modified for this purpose. Mobile antenna 77 is fastened to counting ring 70, which may also be slightly modified for this function.

In summary, the equipment of the vehicle which has just been described, comprising eight pairs of antennas, requires—for putting the present invention into practice in this example—only the use of eight modified bolts (out of a total of at least twenty-four).

The advantages of the present invention are very appreciable. First of all, the device is very easily mounted, and the mounting is performed in complete safety for the measurement elements since these measurement elements are positioned only after the normal tightening of the attaching of the wheel. The fastening system which has been described (thread) can obviously be replaced by any other equivalent known means, such as bayonet, clipping or tightening by collar, for example; it is preferable, however, that the selected fastening method makes it possible to have an identical diameter of the end of the bolt for several diameters of the bolt and thus to limit the number of types of necessary sensor casings 16. On the other hand, the cost of a bolt according to the present invention is extremely modest and its mounting does not cause any change for the preexisting elements, since it is sufficient to replace only one of the bolts for attaching the wheel with the new bolt. Finally, the present invention applies to all types of wheels, and to wheels mounted both in single and dual manner, without it being necessary to modify them.

Obviously, numerous modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A device for monitoring tires, comprising a central processing unit and for each wheel a measuring sensor connected by electrical connection means to a mobile antenna integral with a hub of the wheel as well as a stationary antenna integral with a hub carrier of said wheel and the measuring sensor being coupled to said stationary antenna, said central processing unit supplying said sensor with power and analyzing the measurement signals of said sensor, wherein the electrical connection means comprise at least one electric conductor passing through a fastening bolt for fastening the wheel on the hub, wherein each measuring sensor is fastened to an end of the fastening bolt on an exterior side of the wheel, and wherein an inductive type electric connector is placed at an end of the fastening bolt for assuring electric connection between the sensor and the at least one electric conductor that passes through the fastening bolt.

2. The device for monitoring tires according to claim 1, wherein the stationary antenna is integral with a support of an anti-locking wheel sensor.

3. The device for monitoring tires according to claim 1, wherein the mobile antenna is integral with a counting ring of an anti-locking wheel sensor.

4. A device for monitoring tires comprising:

a measuring sensor connected to a tire;

a hub on which the tire is mounted;

a fastening bolt for fastening the tire to the hub;

a mobile antenna integral with the hub;

a hub carrier on which the hub is mounted;

a stationary antenna coupled to the mobile antenna and integral with the hub carrier;

an electrical connection for connecting the measuring sensor to the mobile antenna, and comprising at least one electrical conductor passing through the fastening bolt; and a central processing unit for analyzing measurement signals from the measuring sensor; and wherein the measuring sensor is fastened to an end of the fastening bolt on an exterior side of the tire, and wherein an inductive type electric connector is placed at an end of the fastening bolt for electric connection between the measuring sensor and the at least one electric conductor that passes through the fastening bolt.

5. The device for monitoring tires according to claim 4, wherein the stationary antenna is integral with a support of an antilocking wheel sensor.

6. The device for monitoring tires according to claim 4, wherein the mobile antenna is integral with a counting ring of an antilocking wheel system.

7. A device for monitoring tires comprising:

a measuring sensor connected to a tire;

a hub on which the tire is mounted;

a fastening bolt for fastening the tire to the hub;

a transmitting means for transmitting measurement signals generated by the measuring sensor;

an electrical connection for connecting the measuring sensor to the transmitting means, and comprising at least one electrical conductor passing through the fastening bolt; and a central processing unit for analyzing measurement signals received from the transmitting means; and wherein the measuring sensor is fastened to an end of the fastening bolt on an exterior side of the tire, and wherein an inductive type electric connector is placed at an end of the fastening bolt for electric connection between the measuring sensor and the at least one electric conductor that passes through the fastening bolt.

8. The device for monitoring tires according to claim 7, wherein the transmitting means comprises an antenna unit.

9. The device for monitoring tires according to claim 8, wherein the antenna unit comprises a mobile antenna and a stationary antenna.

10. The device for monitoring tires according to claim 9, wherein the stationary antenna is integral with a support of an antilocking wheel sensor.

11. The device for monitoring tires according to claim 9, wherein the mobile antenna is integral with counting ring of an antilocking wheel system.

\* \* \* \* \*